United States Patent
Mannheim et al.

(10) Patent No.: US 7,282,146 B2
(45) Date of Patent: Oct. 16, 2007

(54) REMOVAL SYSTEM FOR MEMBRANES IN A MEMBRANE FILTRATION SYSTEM

(75) Inventors: Heather M. A. Mannheim, Hatfield, MA (US); Peter Rogers, Belper (GB); Sofoklis Tsatsaronis, East Brookfield, MA (US)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 11/139,732

(22) Filed: May 27, 2005

(65) Prior Publication Data

US 2006/0021929 A1    Feb. 2, 2006

Related U.S. Application Data

(60) Provisional application No. 60/575,462, filed on May 28, 2004.

(51) Int. Cl.
 *B01D 65/00*   (2006.01)
 *B01D 35/00*   (2006.01)
 *B01D 63/00*   (2006.01)
 *B23Q 1/25*    (2006.01)
 *B23Q 3/00*    (2006.01)

(52) U.S. Cl. .............. 210/236; 210/232; 210/241; 269/55; 269/58

(58) Field of Classification Search ............ 210/232, 210/236, 237, 238, 241, 323.1, 323.2, 340; 269/55, 58; 211/162, 168, 169, 169.1, 174, 211/175
See application file for complete search history.

(56) References Cited

U.S. PATENT DOCUMENTS

| | | | | |
|---|---|---|---|---|
| 2,381,453 A | * | 8/1945 | Hunziker | 210/323.1 |
| 2,417,000 A | * | 3/1947 | Koenig | 210/237 |
| 2,765,083 A | * | 10/1956 | Purmort | 210/236 |
| 2,843,267 A | * | 7/1958 | Anderson | 210/236 |
| 2,936,075 A | * | 5/1960 | Davis | 210/236 |
| 3,028,968 A | * | 4/1962 | Anderson et al. | 210/236 |
| 4,047,623 A | | 9/1977 | Blevitt et al. | |
| 5,547,574 A | * | 8/1996 | Ginn et al. | 210/388 |
| 5,971,513 A | * | 10/1999 | Cassalia | 312/310 |
| 6,319,411 B1 | * | 11/2001 | Cote | 210/636 |
| 6,325,928 B1 | | 12/2001 | Pedersen et al. | 210/232 |
| 2002/0179517 A1 | | 12/2002 | Pedersen | 210/321.8 |

FOREIGN PATENT DOCUMENTS

| | | |
|---|---|---|
| EP | 0510328 | 10/1992 |
| EP | 0582393 | 2/1994 |
| JP | 2000107574 | 4/2000 |

OTHER PUBLICATIONS

PCT International Search Report (PCT/US2005/018835) dated Oct. 13, 2005.

* cited by examiner

*Primary Examiner*—John Kim

(57) ABSTRACT

A removal system for membranes in a membrane filtration system of the type where the membranes (12) are supported on a membrane support rack (13) in a tank or vessel (6) which, in use, contains liquid to be filtered. The tank (6) comprises a selectively operable opening (9) which in an open position allows the removal of the membranes (12) from the tank (6). The membrane support rack (13) is movable relative to the tank (6) to move said membranes (12) through the opening (9), in its open position, to a position outside the tank (6).

3 Claims, 16 Drawing Sheets

REMOVAL SYSTEM FOR MEMBRANES IN A MEMBRANE FILTRATION SYSTEM

CROSS REFERENCE TO RELATED APPLICATION

This application claim the benefit of the earlier filing date of U.S. Provisional Application No. 60/575,462, filed May 28, 2004, which is hereby incorporated by reference.

FIELD OF THE INVENTION

The present invention relates to membrane filtration systems and, in particular, arrangements where the membranes are supported within a tank or vessel containing the feed liquid to be filtered.

BACKGROUND OF THE INVENTION

Conventional membrane filtration designs require the membranes and their supports to be removed for maintenance or servicing by lifting the membranes and/or their supports vertically out of the feed tank. As the membranes are normally grouped together in modules they must be removed by means of an overhead crane or hoist mechanism. This normally requires-extra ceiling height in the installation to allow removal of the membranes by conventional methods.

Such removal methods add to the running costs of the installation, the complexity of the maintenance process and to the likelihood of damage occurring to the membranes.

SUMMARY OF THE INVENTION

Accordingly, a removal system and method that provides reduced installation and maintenance costs, and reduced risk of damage to the membranes during removal is desirable.

The removal system of the preferred embodiment overcomes or ameliorates at least one of the above disadvantages of the prior art systems, or provides a useful alternative.

According to one aspect, the present invention provides a removal system for membranes in a membrane filtration system of the type where the membranes are supported on a membrane support rack in a tank or vessel which, in use, contains a liquid to be filtered, the tank having a selectively operable opening which in an open position allows the removal of the membranes from the tank, wherein the membrane support rack is movable relative to the tank to move the membranes through the opening, in its open position, to a position outside the tank.

For preference, the membranes are suspended from above on the membrane support rack.

Preferably, the system further includes an extendable support rack slidable relative to the tank and slidably engaged with the membrane support rack such that the extendable support rack is slidably extended from the tank and the membrane support rack is slid along the extendable support rack to the position outside the tank.

For preference, the extendable support rack is cantilevered from the tank when extended therefrom. Preferably, the extendable support rack is slidable along tracks provided on the top of the tank. For preference, the extendable support rack is contained within the bounds of the tank when in a non-extended position.

It will be appreciated that a number of other forms of structure can be used in allowing slidable removal of the membrane support rack and the invention is not limited to the preferred arrangements described above. These include a support track independent of the tank either supported from the installation ceiling or from below by a suitable frame and/or supporting the base of the membrane support rack on rollers, wheels or slides to allow slidable removal from the tank In a first embodiment, a removal system is provided for membranes in a membrane filtration system of the type where the membranes are supported on a membrane support rack in a tank or vessel which, in use, contains liquid to be filtered, the tank comprising a selectively operable opening which in an open position allows the removal of the membranes from the tank, wherein the membrane support rack is movable relative to the tank to move the membranes through the opening, in its open position, to a position outside the tank.

In an aspect of the first embodiment, the membranes are suspended from above on the membrane support rack.

In an aspect of the first embodiment, the system further comprises an extendable support rack slidable relative to the tank and slidably engaged with the membrane support rack such that the extendable support rack is slidably extended from the tank and the membrane support rack is slid along the extendable support rack to the position outside the tank.

In an aspect of the first embodiment, the extendable support rack is cantilevered from the tank when extended therefrom.

In an aspect of the first embodiment, the extendable support rack is slidable along tracks provided on the top of the tank.

In an aspect of the first embodiment, the extendable support rack is contained within the bounds of the tank when in a non-extended position.

BRIEF DESCRIPTION OF THE DRAWINGS

A preferred embodiment of the invention will now be described, by way of example only, with reference to the accompanying drawings in which:

FIG. 8b shows a section through the membrane bundle of FIG. 8a.

FIG. 9b shows a section through the membrane bundle of FIG. 9a.

FIG. 10b shows a section through the membrane bundle of FIG. 10a.

FIG. 11b shows a section through the membrane bundle of FIG. 11a.

DETAILED DESCRIPTION OF THE PREFERRED EMBODIMENT

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Figure 1:
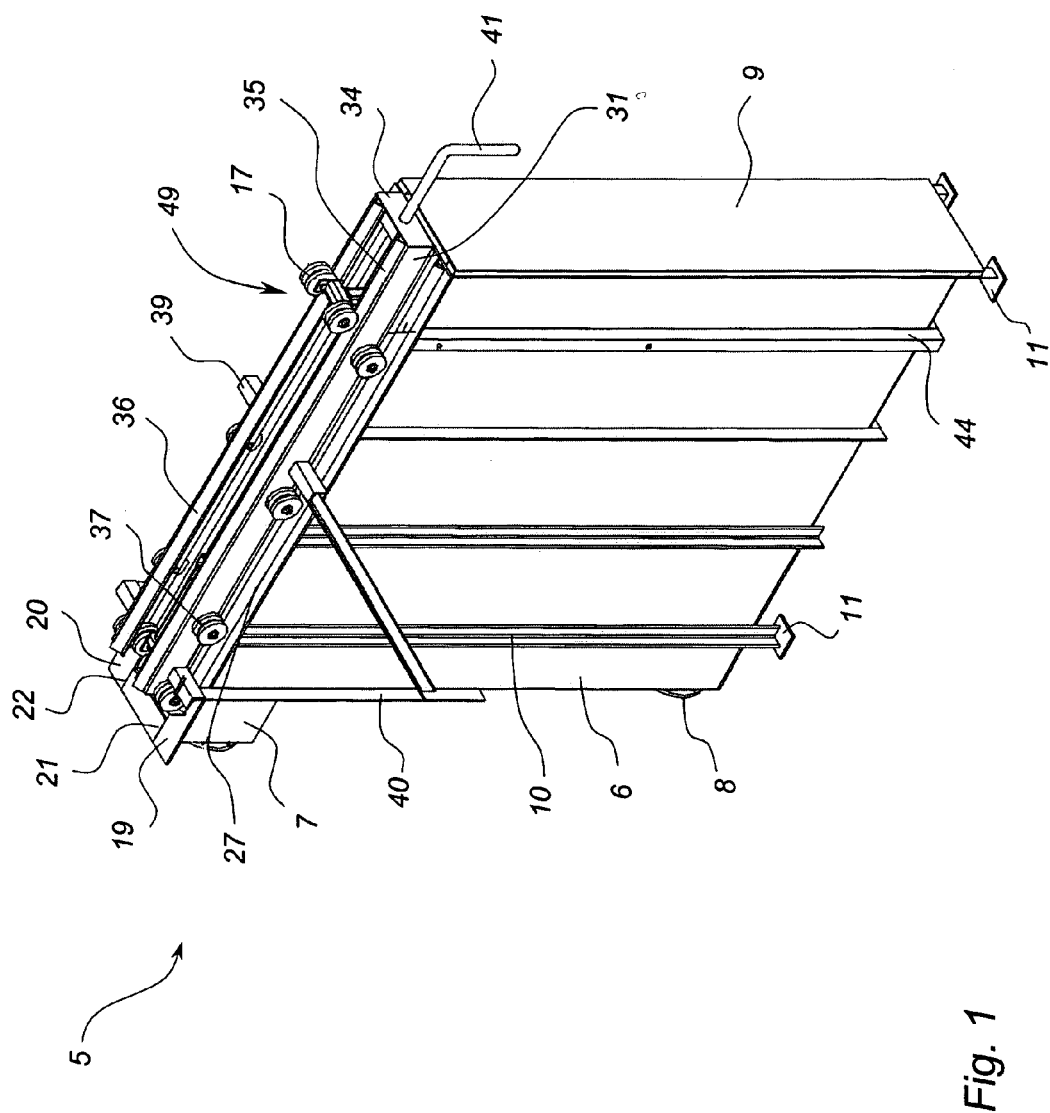
FIG. 1 shows a perspective view of the membrane module in its normal operating configuration with the cantilevered rack support in a retracted position.

Referring to the drawings, FIG. 1 depicts a removal system of a preferred embodiment. FIG. 1 shows the filter module 5 in its normal operating condition. The module 5 comprises an elongate generally rectangular feed tank 6 having ports 7 and 8 for introducing and removing feed from the tank 6. It is generally preferred that the feed tank have a rectangular configuration, however, other configurations can also be employed, depending upon the number and arrangement of membrane modules within the feed tank. For example, the feed tank can be square, cylindrical, triangular, or employ any other configuration, as desired. It is generally preferred to employ a single port for introducing feed into the tank, and a single port for removing feed from the tank. However, in certain embodiments it can be desirable to employ two or more inlet ports, or two or more outlet ports. The inlet port or ports are preferably situated at or above the top portion of the tank, and the outlet port or ports are preferably situated at or above the bottom portion of the tank. The ports can be situated on a side wall of the tank, or at some other location, e.g., a bottom wall.

The tank 6 has a removable end wall 9 and is supported by side members 10 with feet 11. While it is generally preferred to employ side members for support, in certain embodiments it can be desirable to omit such members. In such embodiments, the tank rests on the floor. Alternatively, feet only secured to the bottom of the tank can be employed, without the side members. Side members alone, e.g., for reinforcement of the tank structure, can be employed. In one embodiment, one or more support structures, with or without feet, can be placed beneath the tank such that the bottom of the tank does not rest directly on the floor. The side members and feet can be of any suitable configuration. For example, the support members can comprise tubes, bars having a circular, rectangular, square, or other cross section, I-shaped beams, L-shaped beams, or any other desired configuration. Feet comprising a flat sheet of metal are generally preferred, preferably a square sheet, however other configurations can be employed, e.g., circular sheet, and any suitable thickness can be employed. Preferably the side members and feet are constructed of a metal, e.g., steel, aluminum, or alloy, however, any suitable material can be employed, for example, a composite material, e.g., reinforced concrete, or a polymeric or other material, e.g., carbon fibers, and the like.

Figure 3:
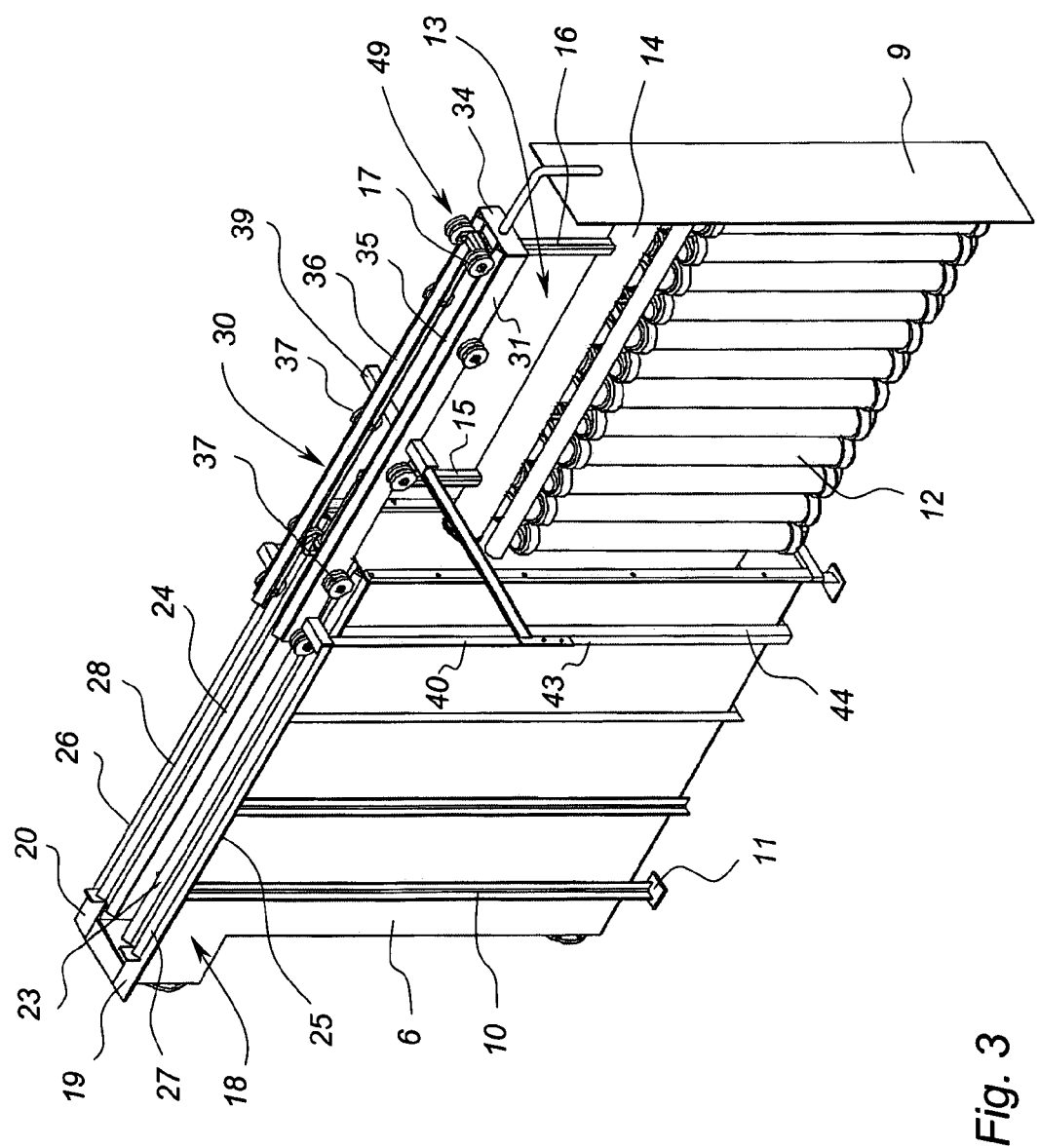
FIG. 3 shows a perspective view of the module of FIGS. 1 and 2 with membranes modules removed from the feed tank and supported on the cantilevered rack support.

As shown in FIG. 3 the filter module 5 contains a plurality of membrane modules 12 supported in a membrane rack 13 formed from the filtrate manifold 14 and associated components. Vertically extending support members 15 and 16 are fixed at one end to either end of the filtrate manifold 14 and have a wheeled trolley arrangement 17 at their distal ends. While it is generally preferred to employ a wheeled trolley arrangement at the distal end, any other suitable arrangement can also be employed, such as a member that slides over a track, or a member supported by ball bearings.

The tank 6 is open at its top and along the length of each side 18 has opposed inwardly extending lip members 19 and 20. The inner edges 21 and 22 of the respective lip members 19 and 20 are provided with respective rack rear support tracks 23 and 24 extending along the length of the lips 19 and 20. The outer edges 25 and 26 of the respective lip members 19 and 20 are provided with respective cantilever rack support tracks 27 and 28 extending generally parallel to the rack rear support tracks 23 and 24. In this embodiment the tracks are formed from upwardly extending v-shaped angle members but it will be appreciated that any form of suitable track can be used. While it is generally preferred to have the support tracks positioned on the sides of the tank, other configurations can also be employed. For example, it may be preferred to support the removal system on a frame positioned over the tank, or suspended from the ceiling, such that the system is not supported by the tank. A frame system can also be employed to support the filter modules above a tank of any configuration, without the need to rely on the tank walls for support.

The cantilever rack support 30 comprises a generally elongate rectangular structure of similar dimension to the cross section of the tank 6 having a pair of elongate side members 31 and 32 joined at each end by end members 33 (not depicted) and 34. The members 31 to 34 are typically formed of angle or channel elements. While it is generally preferred that the rack support is of similar dimension to the cross section of the tank, other shapes can be employed. For example, if a tank contains a series of banks of filter modules, it can be preferred to employ multiple cantilever rack supports arranged parallel to each other over the tank. A suitable frame or one or more support members can be employed to support the parallel rack system, or the racks can be secured to each other, the outer racks along the tank walls providing support for the racks over the center of the tank.

The upper edge of each side member 31 and 32 is provided with respective rack front support tracks 35 and 36 extending longitudinally along the length of each respective side support member.

A series of rollers or wheels 37 are provided at spaced locations along the length of the side members 31 and 32 having rotation axes normal to the side members and attached thereto. In this embodiment the wheels 37 are v-grooved to engage with the inverted v-shaped tracks 27, 28, 35 and 36. While v-grooved tracks are generally preferred, any suitable configuration can be employed.

A pair of angled brace members 38 (one not shown) extend downwardly from a cross member 39 located midway along the length of the rack support 30 to a vertical downwardly extending support strut 40 located at the rear of the rack support 30.

A hooked handle 41 is provided at end 34 of the rack support 30, to facilitate removal. Any suitable configuration for the handle can be employed, or the handle can be dispensed with altogether.

Figure 2:
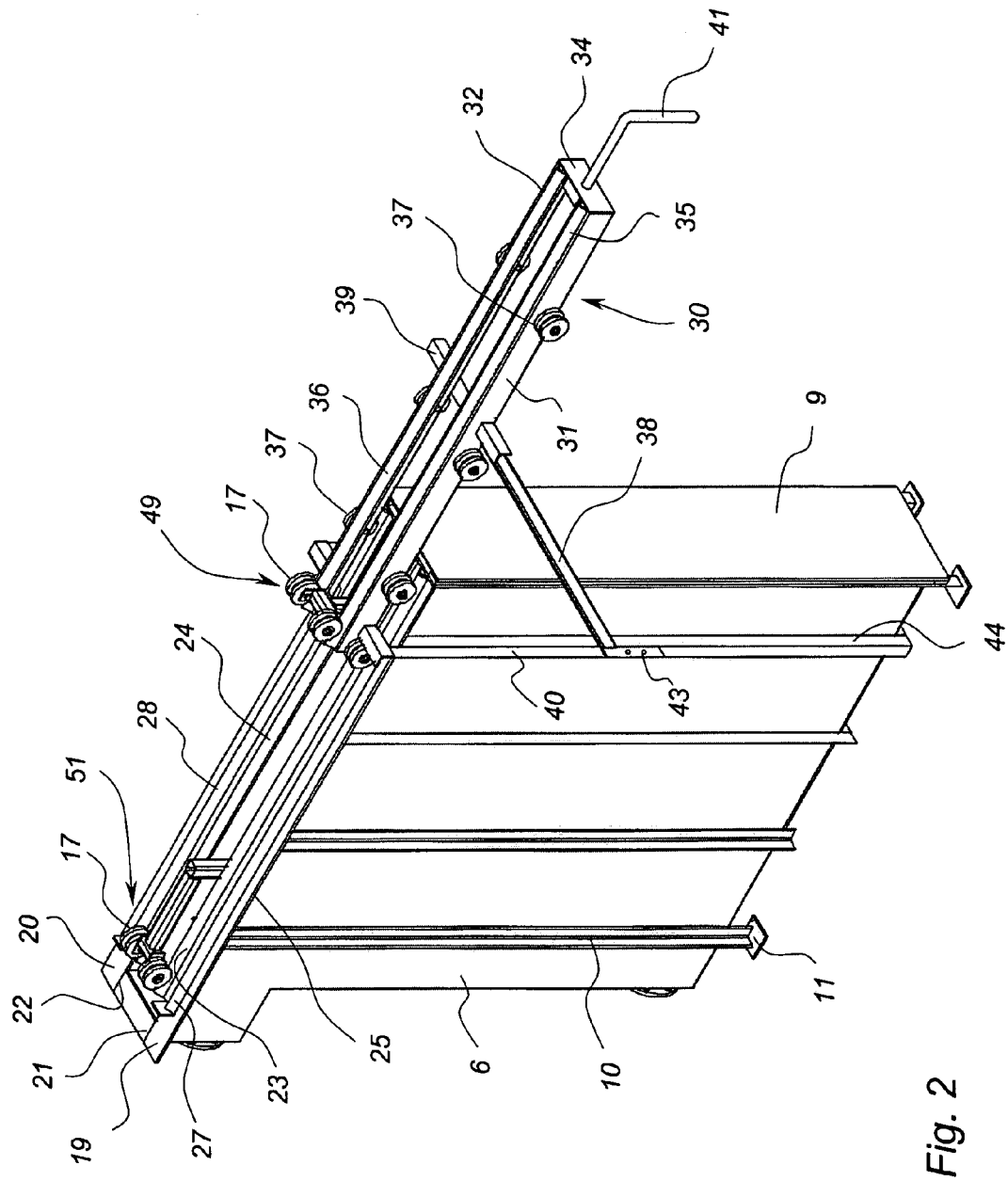
FIG. 2 shows a perspective view of the module of FIG. 1 with the cantilevered rack support in an extended position.

When the filtration module 5 is in normal operation, the cantilever rack support 30 is in its normal retracted position over the tank 6 as shown in FIG. 1. When maintenance to the membrane module rack 13 is required, the tank 6 is drained and the removable end wall 9 is removed and set aside. The end wall can be fitted to the tank in any suitable fashion. A gasket seal can be employed, and the wall secured to the tank with clamps, bolts, or any other suitable fasteners. In an alternative embodiment, the wall is secured to the tank with hinges and a latch, such that the wall can be swung open. The plant operator then extends the cantilever rack support 30 away from the tank 6 by pulling on the handle 41 attached to the assembly as shown in FIG. 2. The cantilever rack support 30 travels along the top of the tank 6 on its v-groove wheels 37, guided by the tracks 27 and 28 on the outer edge of the tank 6. Once in its fully extended position the cantilever rack support 30 is locked in place by pins 43 passing through the support strut 40 and stiffener elements 44 extending down the sides of the tank 6.

Figure 4A:
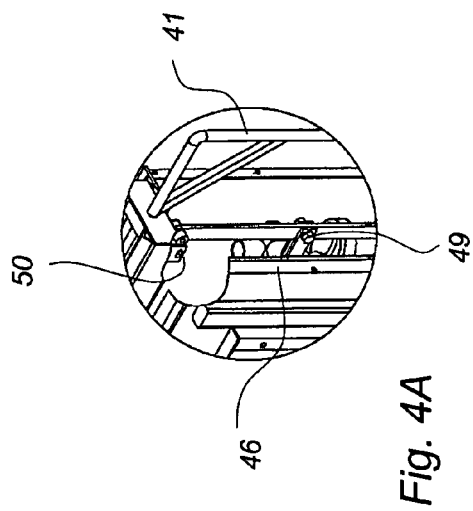
FIGS. 4A and 4B show enlarged view of the circled portions of FIG. 4.
Figure 4B:
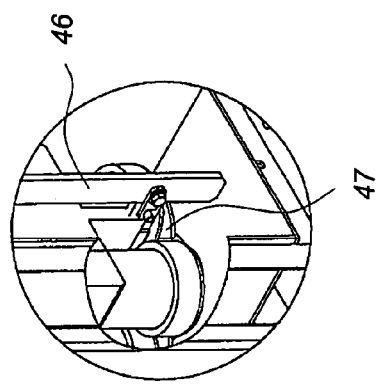
Figure 4:
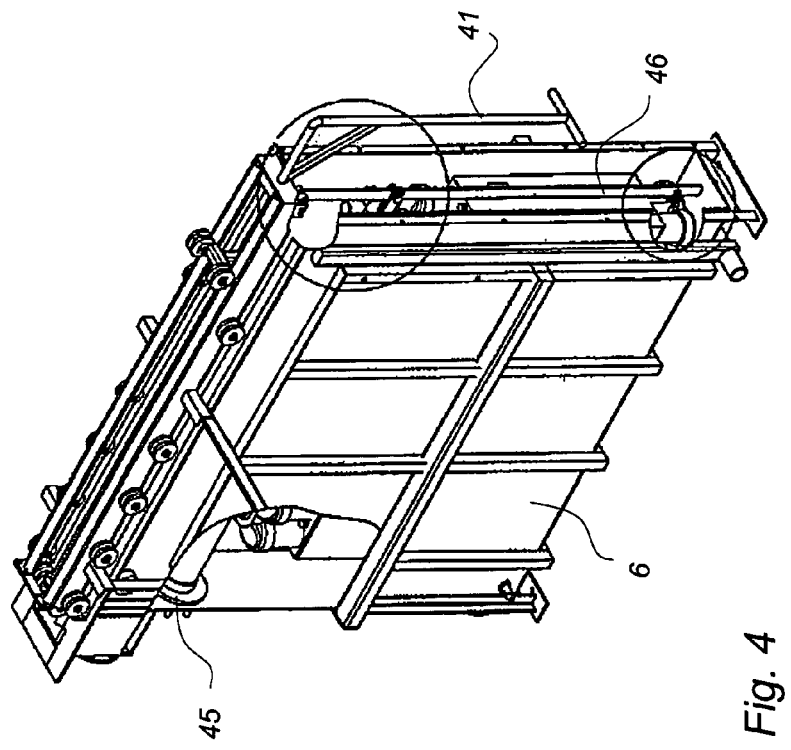
FIG. 4 shows a partially cutaway view of the membrane module in its normal operating position.
Figure 5A:
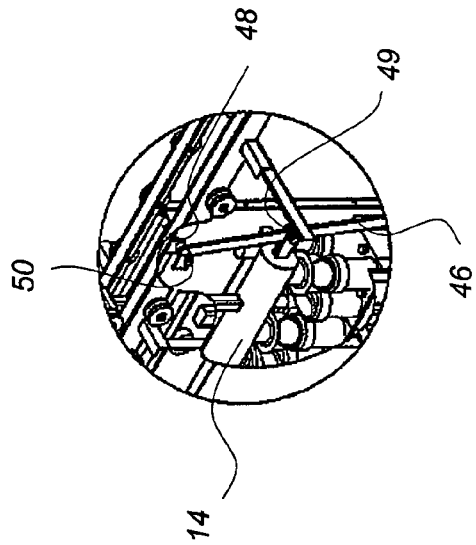
FIG. 5A shows an enlarged view of the circled portion of FIG. 5.
Figure 5:
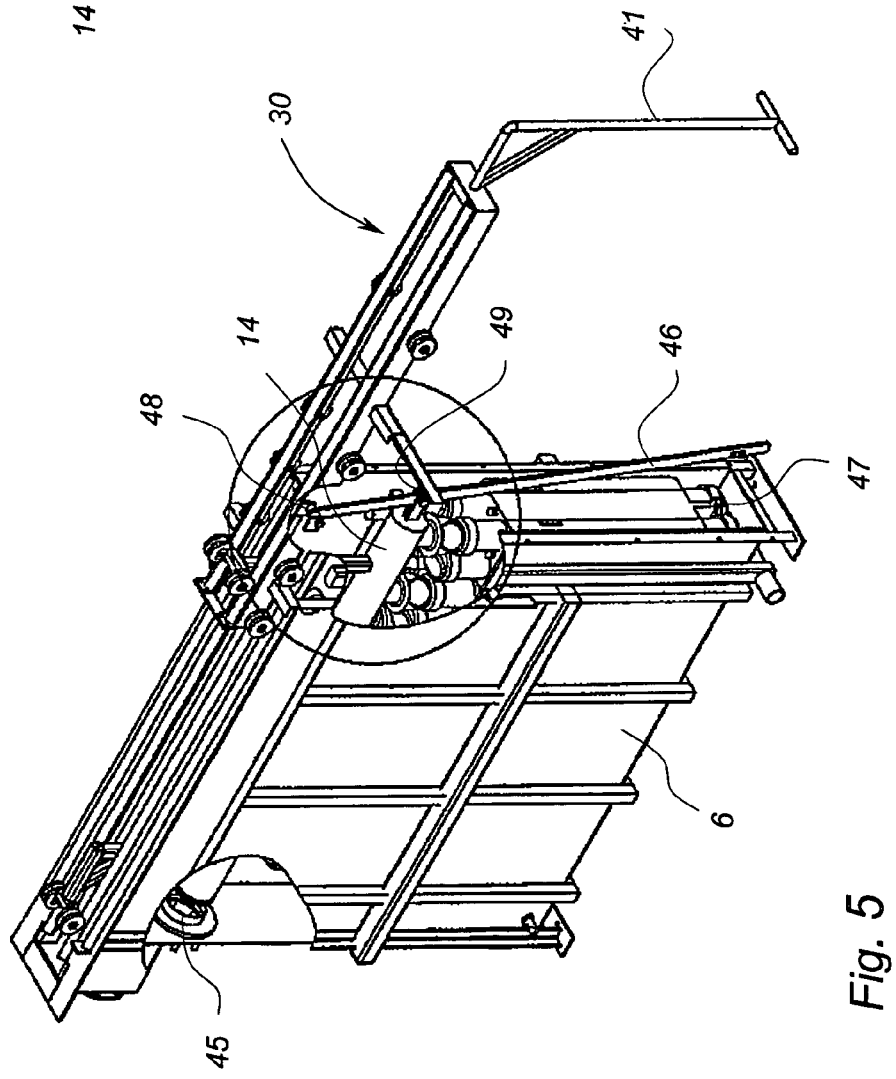
FIG. 5 shows a partially cutaway view of the membrane module of FIG. 4 with the cantilevered rack support in an extended position.

As shown in FIGS. 4 and 5, the membrane module rack 13 is then unseated from the socket connection 45 located at the rear of the tank 6. This is done by unlatching the rack lever 46 from the bottom air manifold 47 as best shown in FIGS. 4, 4A and 4B of the drawings. Two pivot points on the rack lever 46 allow for the membrane module rack 13 to be pried out of the socket connection 45. The top pivot point is comprised of a removable bolt 48 that creates an axis for the rack lever 46 when assembled to the brackets located on the tank 6. The second pivot point is permanently located on the end of the filtrate manifold of the membrane module rack 13. As shown in FIGS. 5 and 5A, when the lever 46 is pulled out away from the tank 6, the top remains stationery, transferring the force to the second pivot point, resulting in the removal of the membrane module rack from the filtrate connection at the rear of the tank 6.

To fully remove the membrane module rack 13 from the tank 6, the bolt 45 at the top pivot point is removed, the bottom of the lever 46 is then latched again to the air manifold 47, and the lever 46 now acts as a handle. As shown in FIG. 3, the membrane module rack 13 is then pulled out the length of the cantilever rack support 30, with the wheels 17 guided by the tracks 23, 24, 35 and 36. The membrane module rack 13, in the extended position, hangs by the front rack support 49 from the cantilever rack support 30 and the rear rack support 50 from the front of the tank 6.

To insert the rack, the procedure above is reversed.

An advantage of the system described above is that it is supported on the top of the side walls of the tank containing the modules. Such an arrangement offers advantages in terms of space utilization and compact design. In an alternative embodiment, the membrane module rack is supported on a frame equipped with wheels at its base, the wheels resting on the floor, or in a track on the floor. To remove the membrane modules from the tank, a wall is opened, and the frame is rolled forward. Such a system can offer advantages in terms of retrofitting existing tanks, or accommodating non-standard tank configurations.

The cantilever system described above is advantageously employed in any membrane filtration system employing modules or cassettes suspended in a tank. Such systems can be employed for water treatment (e.g., aerobic, anaerobic, or non-aerobic systems), or for filtration of any suitable liquid substrate. The system is particularly preferred for use in conjunction with membrane bioreactor systems. Membrane bioreactor systems combine biological treatment, involving bacteria, with membrane separation to treat wastewater. Treated water is separated from the purifying bacteria, referred to as activated sludge, by a process of membrane filtration. Membrane bioreactors preferably employ submerged hollow fiber membrane modules incorporated in a distributed flow reactor.

Membrane processes can be used as an effective tertiary treatment of sewage and provide quality effluent. Submerged membrane processes where the membrane modules are immersed in a large feed tank and filtrate is collected through suction applied to the filtrate side of the membrane, and wherein the membrane bioreactor combines biological and physical processes in one stage, are compact, efficient, economic, and versatile.

The cantilever system described herein can be modified or adapted to accommodate various membrane module or cartridge systems as are commercially available, such as those commercially available from USFilter Memcor Research Pty. Ltd. Membrane modules and cartridges, and related systems, devices, and methods, are described, for example, in U.S. Pat. No. 5,639,373, U.S. Pat. No. 5,783,083, U.S. Pat. No. 5,910,250, U.S. Pat. No. 5,944,997, U.S. Pat. No. 6,042,677, U.S. RE37,549, U.S. Pat. No. 6,193,890, U.S. Pat. No. 6,294,039, U.S. Pat. No. 6,620,319, U.S. Pat. No. 6,685,832, U.S. Pat. No. 6,682,652, U.S. Pat. No. 6,319,411, U.S. Pat. No. 6,375,848, U.S. Pat. No. 6,245,239, U.S. Pat. No. 6,325,928, U.S. Pat. No. 6,550,747, U.S. Pat. No. 6,656,356, U.S. Pat. No. 6,708,957, U.S. Pat. No. 6,706,189, U.S. Publ. No. 2004-0035780-A1, U.S. Publ. No. 2003-0164332-A1, U.S. Publ. No. 2002-0130080-A1, U.S. Publ. No. 2002-0179517-A1, U.S. Publ. No. 2004-0007527 A1, U.S. Pat. No. 5,918,264, U.S. Pat. No. 6,159,373, U.S. Pat. No. 6,077,435, U.S. Pat. No. 6,156,200, U.S. Pat. No. 6,254,773, U.S. Pat. No. 6,202,475, U.S. Design Patent 478913, U.S. Design Patent 462699, and U.S. Pat. No. 6,524,481, the contents of which are hereby incorporated by reference in their entirety.

The membrane bioreactor systems preferably employed in the preferred embodiments utilize an effective and efficient membrane cleaning method. Commonly used physical cleaning methods include backwash (backpulse, backflush) using a liquid permeate or a gas, membrane surface scrubbing, and scouring using a gas in the form of bubbles in a liquid. Examples of the second type of method are described in U.S. Pat. No. 5,192,456 to Ishida et al., U.S. Pat. No. 5,248,424 to Cote et al., U.S. Pat. No. 5,639,373 to Henshaw et al., U.S. Pat. No. 5,783,083 to Henshaw et al., and U.S. Pat. No. 6,555,005 to Zha et al.

In the examples referred to above, a gas is injected, usually by a pressurized blower, into a liquid system where a membrane module is submerged to form gas bubbles. The bubbles so formed then travel upwards to scrub the membrane surface to remove the fouling substances formed on the membrane surface. The shear force produced largely relies on the initial gas bubble velocity, bubble size, and the resultant forces applied to the bubbles. The fluid transfer in this approach is limited to the effectiveness of the gas lifting mechanism. To enhance the scrubbing effect, more gas has to be supplied. However, this method has several disadvantages: it consumes large amounts of energy, it can form mist or froth flow reducing effective membrane filtration area, and can be destructive to membranes. Moreover, in an environment of high concentration of solids, the gas distribution system can gradually become blocked by dehydrated solids or simply be blocked when the gas flow accidentally ceases.

For most tubular membrane modules, the membranes are flexible in the middle (longitudinal directions) of the modules but tend to be tighter and less flexible towards to both potted heads. When such modules are used in an environment containing high concentrations of suspended solids, solids are easily trapped within the membrane bundle, especially in the proximity of two potted heads. The methods to reduce the accumulation of solids include the improvement of module configurations and flow distribution when gas scrubbing is used to clean the membranes.

In the design of a membrane module, the packing density of the tubular membranes in a module is one factor that is considered. The packing density of the fiber membranes in a membrane module as used herein is defined as the cross-sectional potted area taken up by the fiber membranes divided by the total potted area and is normally expressed as a percentage. From the economical viewpoint it is desirable that the packing density be as high as possible to reduce the cost of making membrane modules. In practice, solid packing is reduced in a less densely packed membrane module. However, if the packing density is too low, the rubbing effect between membranes could also be lessened, resulting in less efficient scrubbing/scouring of the membrane surfaces. It is thus desirable to provide a membrane configuration that assists removal of accumulated solids while maximizing packing density of the membranes. The membranes can be in contact with each other (e.g., at high packing densities), or can be closely or distantly spaced apart (e.g., at low packing densities), for example, a spacing between fiber walls of from about 0.1 mm or less to about 10 mm or more is typically employed.

In some embodiments, a method of scrubbing a membrane surface using a liquid medium with gas bubbles entrained therein, including the steps of entraining the gas bubbles—into the liquid medium by flow of the liquid medium past a source of the gas, and flowing the gas bubbles and liquid medium along the membrane surface to dislodge fouling materials therefrom, can be employed in membrane bioreactors.

Preferably, the gas bubbles are entrained into the liquid stream by means of a venturi device or other type of junction. For further preference, the gas bubbles are entrained or injected into the liquid stream by means of devices which forcibly mix gas into a liquid flow to produce a mixture of liquid and bubbles, such devices including a jet, nozzle, ejector, eductor, injector or the like. Optionally, an additional source of bubbles can be provided in the liquid medium by means of a blower or like device. The gas used can include, for example, air, nitrogen, oxygen, gaseous chlorine, or ozone. Air is the most economical for the purposes of scrubbing and/or aeration. Gaseous chlorine can be used for scrubbing, disinfection, and enhancing the cleaning efficiency by chemical reaction at the membrane surface. The use of ozone, besides the similar effects mentioned for gaseous chlorine, has additional features, such as oxidizing disinfectant by-product (DBP) precursors and converting non-biodegradable Natural Organic Matter (NOM) to biodegradable dissolved organic carbon.

The membrane modules employed in the membrane bioreactor preferably comprise a plurality of porous membranes arranged in close proximity to one another, optionally mounted to prevent excessive movement therebetween, and include a source of gas bubbles for providing, from within the module gas bubbles entrained in a liquid flow such that, in use, the liquid and bubbles entrained therein move past the surfaces of the membranes to dislodge fouling materials therefrom, the gas bubbles being entrained in the liquid by flowing the liquid past a source of gas to draw the gas into the liquid flow. Preferably, the liquid and bubbles are mixed and then flowed past membranes to dislodge the fouling materials.

The fibers of the membrane bioreactor can be cleaned by providing, from within the array of fibers, by means other than gas passing through the pores of the membranes, uniformly distributed gas-bubbles entrained in a liquid flow, the gas bubbles being entrained in the liquid flow by flowing the liquid past a source of gas so as to cause the gas to be drawn and/or mixed into the liquid, the distribution being such that the bubbles pass substantially uniformly between each membrane in the array to, in combination with the liquid flow, scour the surface of the membranes and remove accumulated solids from within the membrane module. Preferably, the bubbles are injected and mixed into the liquid flow.

Preferably, the membranes of the membrane bioreactor comprise porous hollow fibers, the fibers being fixed at each end in a header, the lower header having one or more holes formed therein through which gas liquid flow is introduced. The holes can be circular, elliptical or in the form of a slot. The fibers are normally sealed at the lower end and open at their upper end to allow removal of filtrate, however, in some arrangements, the fibers can be open at both ends to allow removal of filtrate from one or both ends. The fibers are preferably arranged in cylindrical arrays or bundles, however other configurations can also be employed, e.g., square, hexagonal, triangular, irregular, and the like. It will be appreciated that the cleaning process described is equally applicable to other forms of membrane such flat or plate membranes that can also be employed in membrane bioreactors.

The membrane modules employed in the membrane bioreactor preferably comprise a plurality of porous hollow fiber membranes, the fiber membranes being arranged in close proximity to one another and mounted to prevent excessive movement therebetween, the fiber membranes being fixed at each end in a header, one header having one or more of holes formed therein through which gas/liquid flow is introduced, and partition means extending at least part way between the headers to partition the membrane fibers into groups. Preferably, the partition or partitions are formed by a spacing between respective fiber groups, however porous (e.g., a screen, clip, or ring) or solid partitions can also be employed. The partitions can be parallel to each other or, in the case of cylindrical arrays of fiber membranes, the partitions can extend radially from the center of the array or be positioned concentrically within the cylindrical array.

In an alternative form, the fiber bundle can be provided with a central longitudinal passage extending the length of the bundle between the headers.

The membrane modules employed in a membrane bioreactor preferably include a plurality of porous hollow membrane fibers extending longitudinally between and mounted at each end to a respective potting head, the membrane fibers being arranged in close proximity to one another and mounted to prevent excessive movement therebetween, the fibers being partitioned into a number of bundles at least at or adjacent to their respective potting head so as to form a space therebetween, one of the potting heads having an array of aeration openings formed therein for providing gas bubbles within the module such that, in use, the bubbles move past the surfaces of the membrane fibers to dislodge fouling materials therefrom.

The fiber bundle can be protected and fiber movement can be limited by a module support screen which has both vertical and horizontal elements appropriately spaced to provide unrestricted fluid and gas flow through the fibers and to restrict the amplitude of fiber motion reducing energy concentration at the potted ends of the fibers. Alternatively, clips or rings can also be employed to bind the fiber bundle.

Preferably, the aeration openings are positioned to coincide with the spaces formed between the partitioned bundles. Preferably, the openings comprise one or more holes or slots, which can be arranged in various configurations, e.g., a row of holes. Preferably, the fiber bundles are located in the potting head between the slots or rows of holes. In certain embodiments, it can be preferred to situate the holes or slots within the fiber bundles, or both within and adjacent to the fiber bundles.

Preferably, the gas bubbles are entrained or mixed with a liquid flow before being fed through the holes or slots, though it will be appreciated that gas only can be used in some configurations. The liquid used can be the feed to the membrane module. The fibers and/or fiber bundles can cross over one another between the potting heads though it is desirable that they do not.

Typically, the fibers within the module have a packing density (as defined above) of from about 5% or less to about 75% or more, preferably from about 6, 7, 8, 9, or 10% to about 60, 65, or 70%, and more preferably from about 11, 12, 13, 14, 15, 16, 17, 18, 19, or 20% to about 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55%.

Preferably, the holes have a diameter of from about 0.5 mm or less to about 50 mm or more, more preferably from about 0.6, 0.7, 0.8, 0.9, 1.0, 1.1, 1.2, 1.3, 1.4, or 1.5 to about 25, 30, 35, 40, or 45 mm, and most preferably from about 1.75, 2.0, 2.5, 3.0, 3.5, 4.0, 4.5, or 5.0 mm to about 6, 7, 8, 9, 10, 11, 12, 13, 14, 15, 16, 17, 18, 19, 20, 21, 22, 23, or 24 mm. In the case of a slot or row of holes, the open area is chosen to be equivalent to that of the above holes.

Typically, the fiber inner is from about 0.05 mm or less to about 10 mm or more, preferably from about 0.10, 0.15, or 0.20 mm to about 3, 4, 5, 6, 7, 8, or 9 mm, and preferably from about 0.25, 0.50, 0.75, or 1.0 mm to about 1.25, 1.50, 1.75, 2.00, or 2.50 mm. The fibers wall thickness can depend on materials used and strength required versus filtration efficiency. Typically, wall thickness is from about 0.01 mm or less to about 3 mm or more, preferably from about 0.02, 0.03, 0.04, 0.05, 0.06, 0.07, 0.08, or 0.09 mm to about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or 2.9 mm, and most preferably from about 0.1, 0.2, 0.3, 0.4, or 0.5 mm to about 0.6, 0.7, 0.8, 0.9, or 1 mm.

The membrane bioreactor can include a tank having a line, a pipe, a pump, and or other apparatus for the introduction of feed thereto, an activated sludge within the tank, a membrane module positioned within the tank so as to be immersed in the sludge, and apparatus for withdrawing filtrate from at least one end of the fiber membranes.

The membrane bioreactor is preferably operated by introducing feed to the tank, applying a vacuum to the fibers to withdraw filtrate therefrom while intermittently, cyclically, or continuously supplying gas bubbles through the aeration openings to within the module such that, in use, the bubbles move past the surfaces of the membrane fibers to dislodge fouling materials therefrom. Preferably, the gas bubbles are entrained or mixed with a liquid flow when fed through the holes or slots.

If desired, a further source of aeration can be provided within the tank to assist microorganism activity. Preferably, the membrane module is suspended vertically within the tank and the further source of aeration can be provided beneath the suspended module. Alternatively, the module can be suspended horizontally, or in any other desired position. Preferably, the further source of aeration comprises a group of air permeable tubes or other such aeration source. The membrane module can be operated with or without backwash, depending on the flux. A high mixed liquor of suspended solids (about 5,000 ppm or less to about 20,000 ppm or more) in the bioreactor has been shown to significantly reduce residence time and improve filtrate quality. The combined use of aeration for both degradation of organic substances and membrane cleaning has been shown to enable constant filtrate flow without significant increases in transmembrane pressure while establishing, high concentration of mixed-liquor suspended solids (MLSS). The use of partitioned fiber bundles enables higher packing densities to be achieved without significantly compromising the gas scouring process. This provides for-higher filtration efficiencies to be gained.

Figure 6:
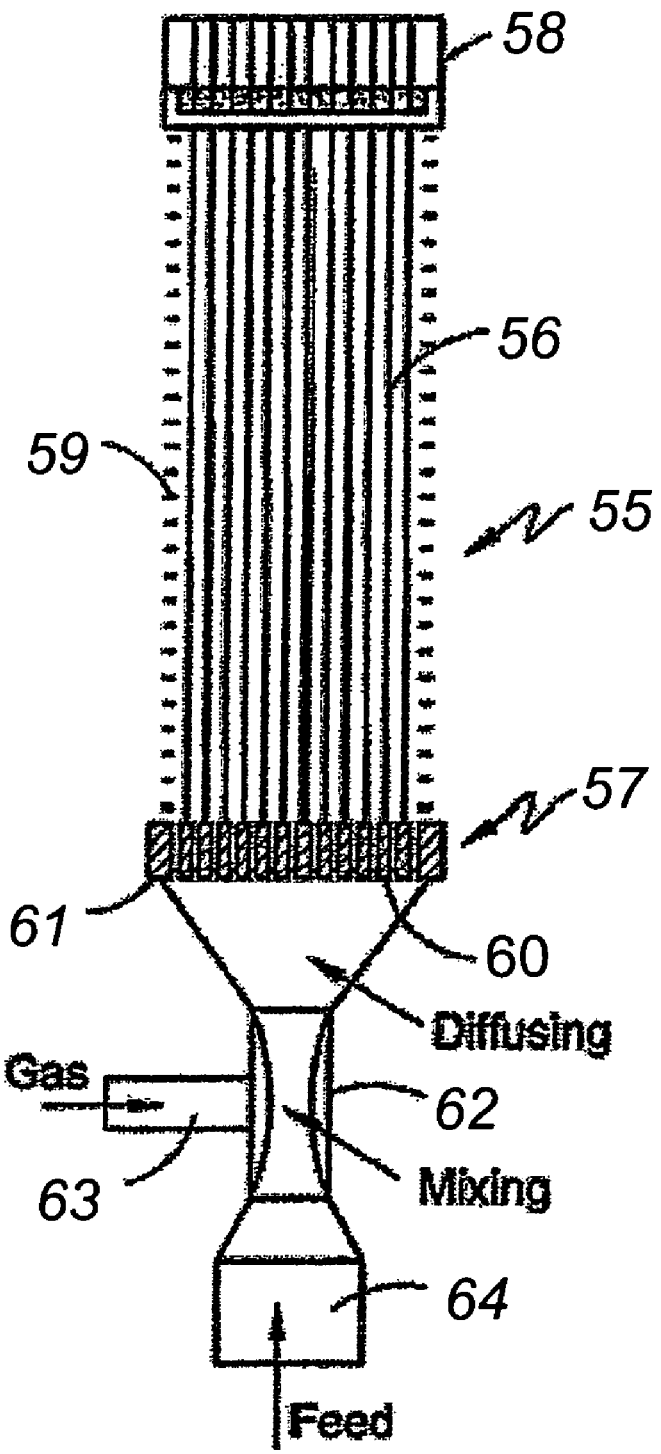
FIG. 6 shows a schematic side elevation of one embodiment of a membrane module and illustrates the method of cleaning in a membrane bioreactor employed in the filtration apparatus of a preferred embodiment.

In a particularly preferred embodiment, a module as described in U.S. Pat. No. 6,555,005 is employed in the membrane bioreactor. Referring to FIG. 6, The membrane module 55 typically comprises fiber, tubular, or flat sheet form membranes 56 potted at two ends 57 and 58 and optionally encased in a support structure, in this case a screen 59. Either one or both ends of the membranes can be used for the permeate collection. The bottom of the membrane module has a number of through apertures 60 in the pot 61 to distribute a mixture of gas and liquid feed past the membrane surfaces. A venturi device 62 or the like is connected to the base of the module. The venturi device 62 intakes gas through inlet 63, mixes or entrains the gas with liquid flowing through feed inlet 64, forms gas bubbles and diffuses the liquid/gas mix into the module apertures 60. After passing through the distribution apertures 60, the entrained gas bubbles scrub membrane surfaces while travelling upwards along with the liquid flow. Either the liquid feed or the gas can be a continuous or intermittent injection depending on the system requirements. With a venturi device it is possible to create gas bubbles and aerate the system without a blower. The venturi device 62 can be a venturi tube, jet, nozzle, ejector, eductor, injector, or the like.

Figure 7:
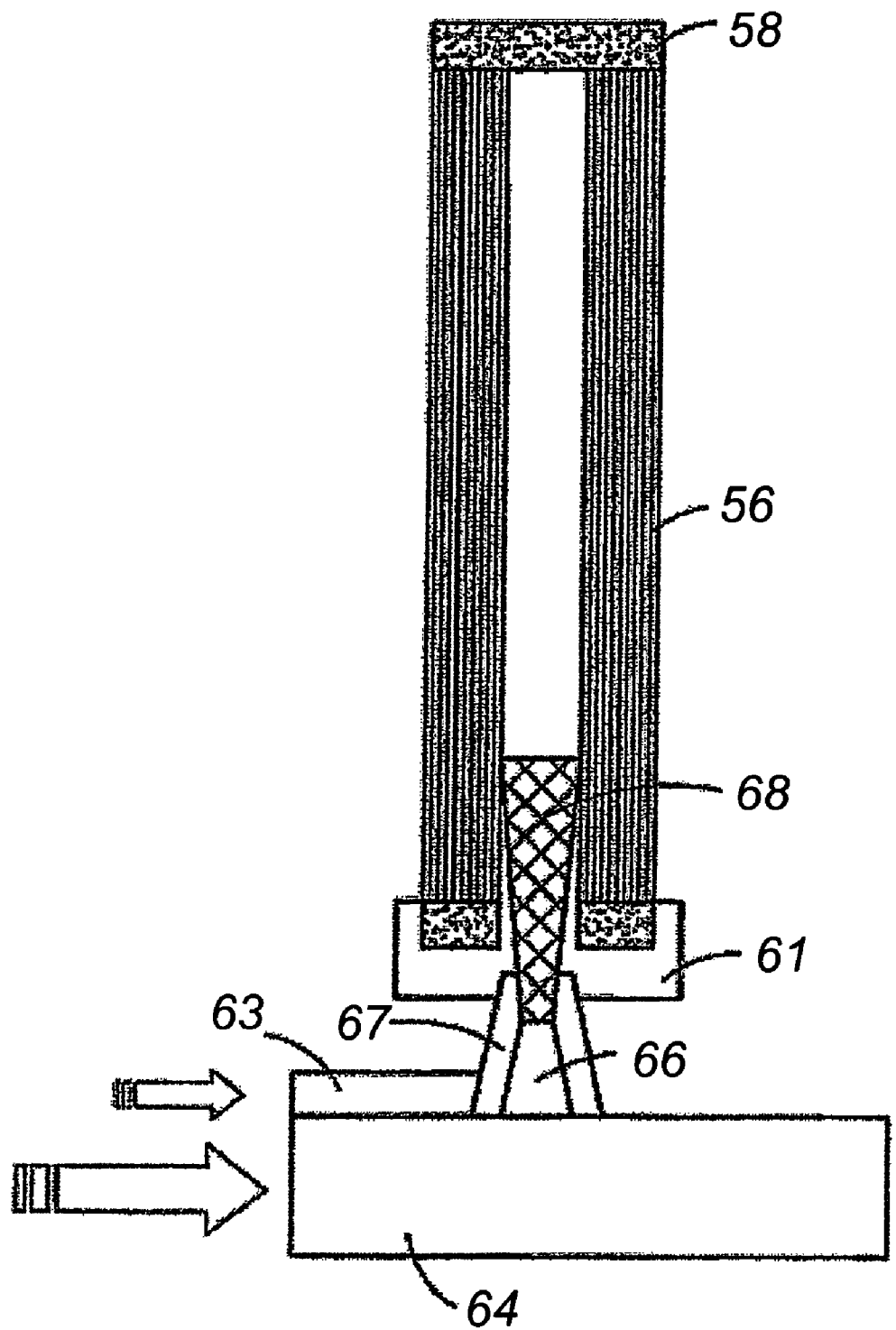
FIG. 7 shows an enlarged schematic side elevation of one form of the jet type arrangement used to form entrained gas bubbles of a membrane bioreactor employed in the filtration apparatus of a preferred embodiment.

Referring to FIG. 7, an enlarged view of jet or nozzle type device 65 is shown. In this embodiment, liquid is forced through a jet 66 having a surrounding air passage 67 to produce a gas entrained liquid flow 68. Such a device allows the independent control of gas and liquid medium—by adjusting respective supply valves.

The liquid commonly used to entrain the gas is the feed water, wastewater, or mixed liquor to be filtered. Pumping such an operating liquid through a venturi or the like creates a vacuum to suck the gas into the liquid, or reduces the gas discharge pressure when a blower is used. By providing the gas in a flow of the liquid, the possibility of blockage of the distribution apertures 60 is substantially reduced.

By using a venturi device or the like it is possible to generate gas bubbles to scrub membrane surfaces without the need for a pressurized gas supply such as a blower. When a motive fluid passes through a venturi it generates a vacuum to draw the gas into the liquid flow and generate gas bubbles therein. Even if a blower is still required, the use of the above process reduces the discharge pressure of the blower and therefore lowers the cost of operation. The liquid and gas phases are well mixed in the venturi and then diffuse into the membrane module to scrub the membranes. Where a jet type device is used to forcibly mix the gas into the liquid medium, an additional advantage is provided in that a higher velocity of bubble stream is produced. In treatment of wastewater, such thorough mixing provides excellent oxygen transfer when the gas used is air or oxygen. If the gas is directly injected into a pipe filled with a liquid, it is impossible that the gas will form a stagnant gas layer on the pipe wall and therefore gas and liquid will bypass into different parts of a module, resulting in poor cleaning efficiency. The flow of gas bubbles is enhanced by the liquid flow along the membrane resulting in a large scrubbing shear force being generated. This method of delivery of gas/liquid provides a positive fluid transfer and aeration with the ability to independently adjust flow rates of gas and liquid. The injection of a mixture of two-phase fluid (gas/liquid) into the holes of the air distribution device can eliminate the formation of dehydrated solids and therefore prevent the gradual blockage of the holes by such dehydrated solids. The injection arrangement further provides an efficient cleaning mechanism for introducing cleaning chemicals effectively into the depths of the module while providing scouring energy to enhance chemical cleaning. This arrangement, in combination with the high packing density obtainable with the module configuration described, enables the fibers to be effectively cleaned with a minimal amount of chemicals. The module configuration described allows a higher fiber packing density in a module without significantly increasing solid packing. This adds an additional flexibility that the membrane modules can be either integrated into the aerobic basin or arranged in a separate tank. In the latter arrangement, the advantage is a significant saving on chemical usage due to the small chemical holding in the tank and in labor costs because the chemical cleaning process can be automated. The reduction in chemicals used is also important because the chemicals, which can be fed back to the bio process, are still aggressive oxidizers and therefore can have a deleterious effect on bio process. Accordingly, any reduction in the chemical load present in the bio-process provides significant advantages.

The positive injection of a mixture of gas and liquid feed to each membrane module provides a uniform distribution of process fluid around membranes and therefore minimizes the feed concentration polarization during filtration. The concentration polarization is greater in a large-scale system and for the process feed containing large amounts of suspended solids. The prior art systems have poor uniformity because the process fluid often enters one end of the tank and concentrates as it moves across the modules. The result is that some modules must deal with much higher concentrations than others, resulting in inefficient operation. The filtration efficiency is enhanced due to a reduced filtration resistance. The feed side resistance is decreased due to a reduced transverse flow passage to the membrane surfaces and the turbulence generated by the gas bubbles and the two-phase flow. Such a cleaning method can be used to the treatment of drinking water, wastewater, and the related processes by membranes. The filtration process can be driven by suction or pressurization.

Figure 8A:
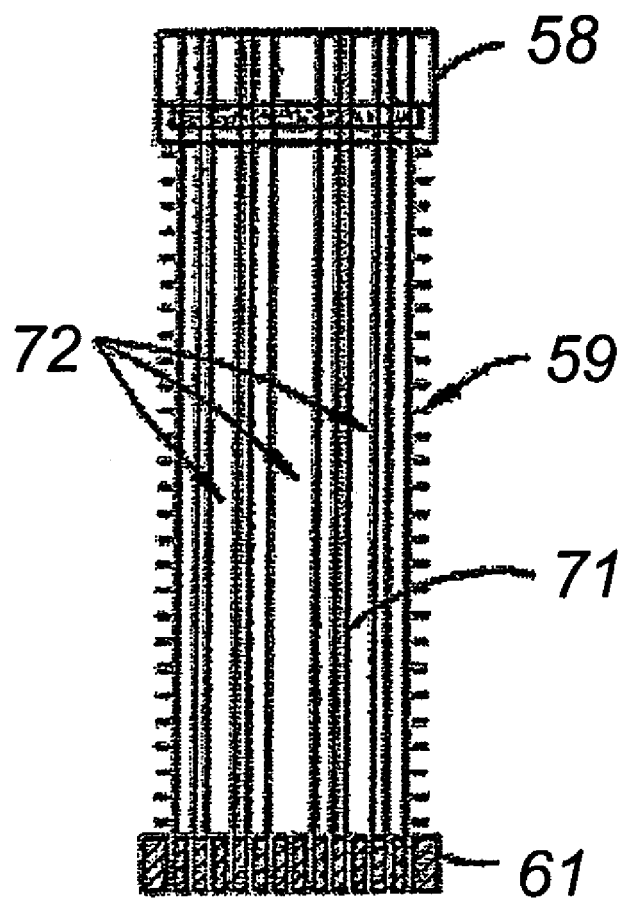
FIG. 8a shows a schematic side elevation of a partitioned membrane module of a membrane bioreactor employed in the filtration apparatus of a preferred embodiment.
Figure 8B:
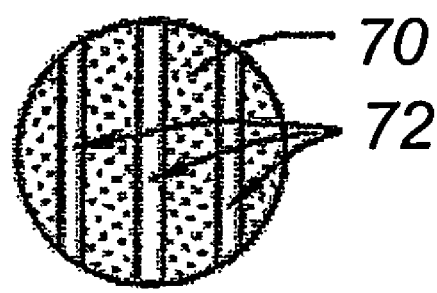
Figure 9A:
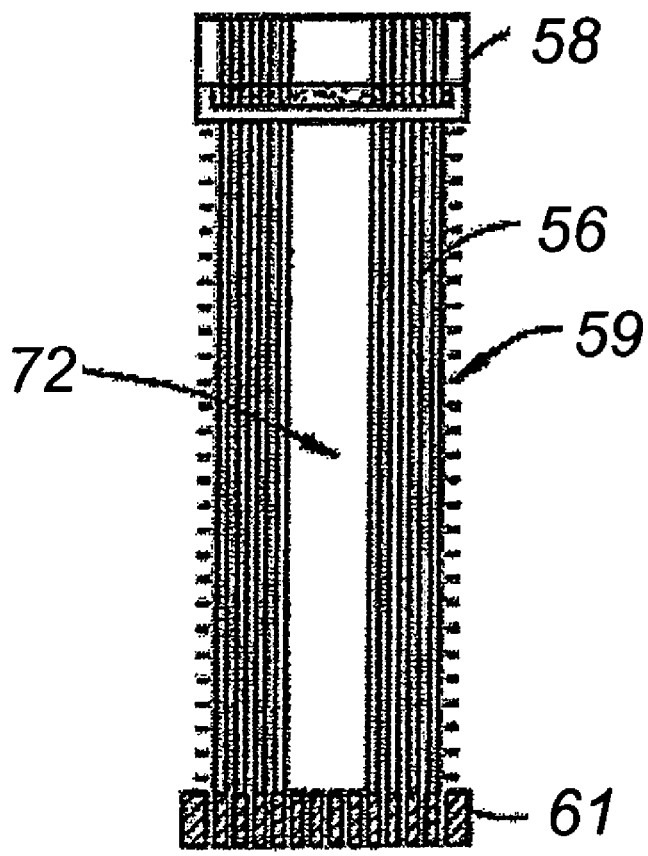
FIG. 9a shows a schematic side elevation of a partitioned membrane module of a membrane bioreactor employed in the filtration apparatus of a preferred embodiment.
Figure 9B:
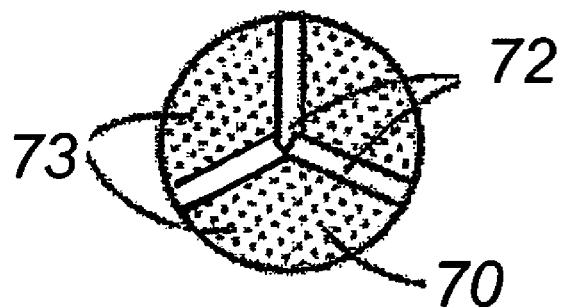

Referring to FIGS. 8a, 8b, 9a, and 9b, embodiments of various partitioning arrangements are shown. Again these embodiments are illustrated with respect to cylindrical tubular or fiber membrane bundles 70, however, it will be appreciated that other configurations can be employed. FIGS. 8a and 8b show a bundle of tubular membranes 70 partitioned vertically into several thin slices 71 by a number of parallel partition spaces 72. This partitioning of the bundle enables accumulated solids to be removed more easily without significant loss of packing density. Such partitioning can be achieved during the potting process to form complete partitions or partial partitions. Another method of forming a partitioned module is to pot several small tubular membrane bundles 73 into each module as shown in FIGS. 9a and 9b.

Figure 10A:
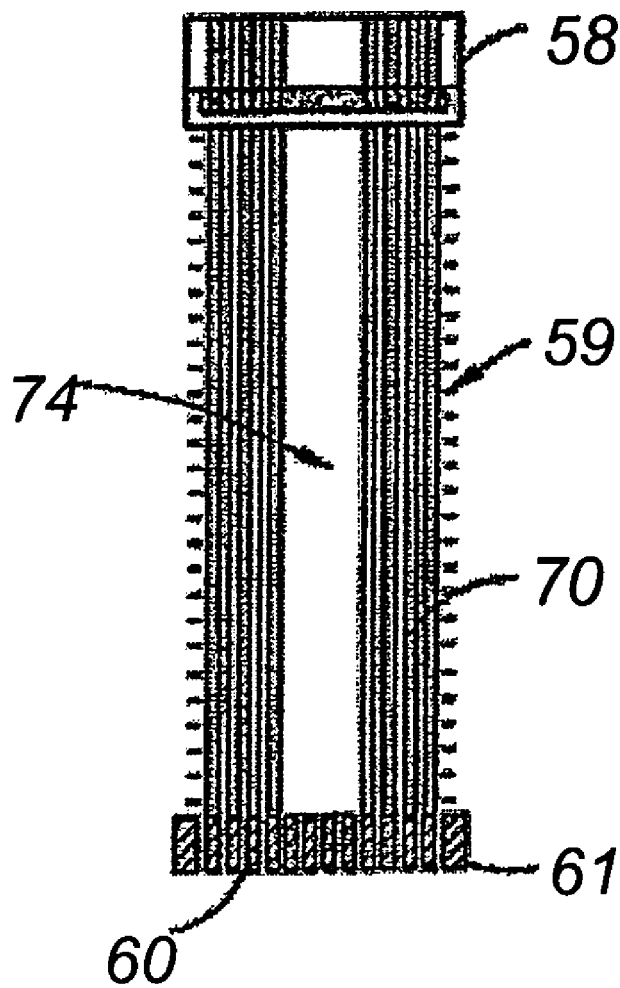
FIG. 10a shows a schematic side elevation of a partitioned membrane module of a membrane bioreactor employed in the filtration apparatus of a preferred embodiment.
Figure 10B:
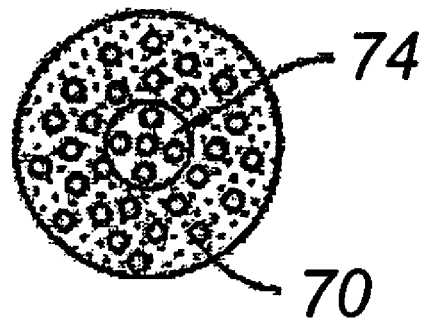

Another configuration of membrane module is illustrated in FIGS. 10a and 10b. The central membrane-free zone forms a passage 74 to allow for more air and liquid injection. The gas bubbles and liquid then travel along the tubular membranes 70 and pass out through arrays of fibers at the top potted head 58, scouring and removing solids from membrane walls. A single gas or a mixture of gas/liquid can be injected into the module.

Figure 11A:
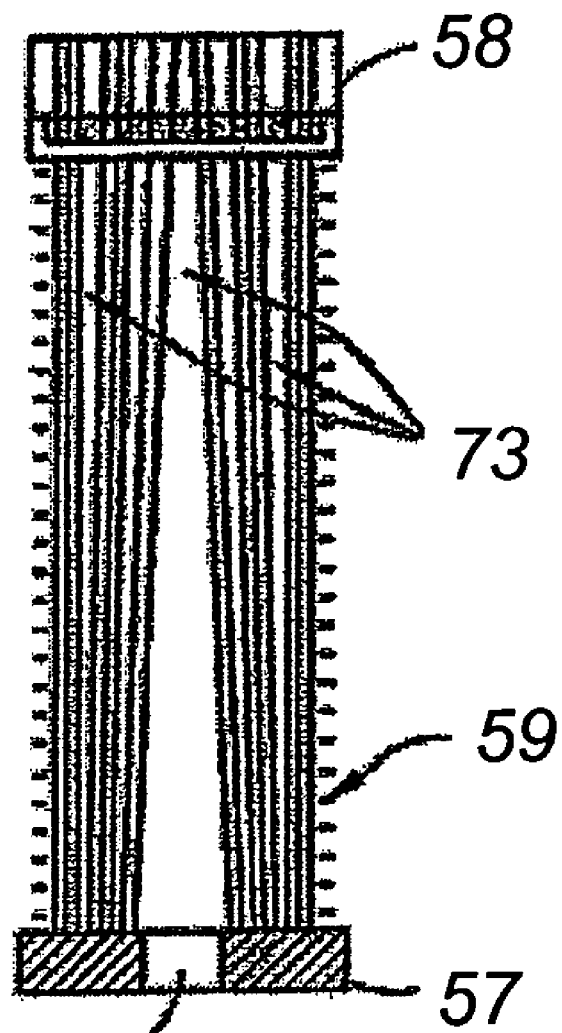
FIG. 11a shows a schematic side elevation of a partitioned membrane module of a membrane bioreactor employed in the filtration apparatus of a preferred embodiment.
Figure 11B:
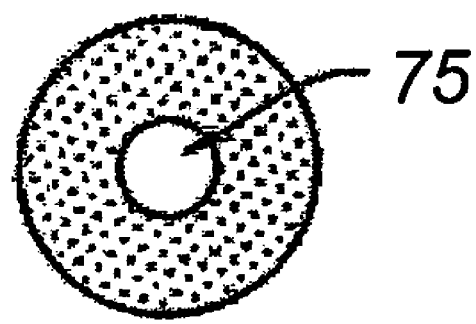

FIGS. 11a and 11b illustrate yet a further embodiment similar to FIG. 7 but with single central hole 75 in the lower pot 57 for admission of the cleaning liquid/gas mixture to the fiber membranes 70. In this embodiment, the fibers are spread adjacent the hole 30 and converge in discrete bundles 73 toward the top pot 58. The large central hole 75 has been found to provide greater liquid flow around the fibers and thus improved cleaning efficiency.

Figure 12:
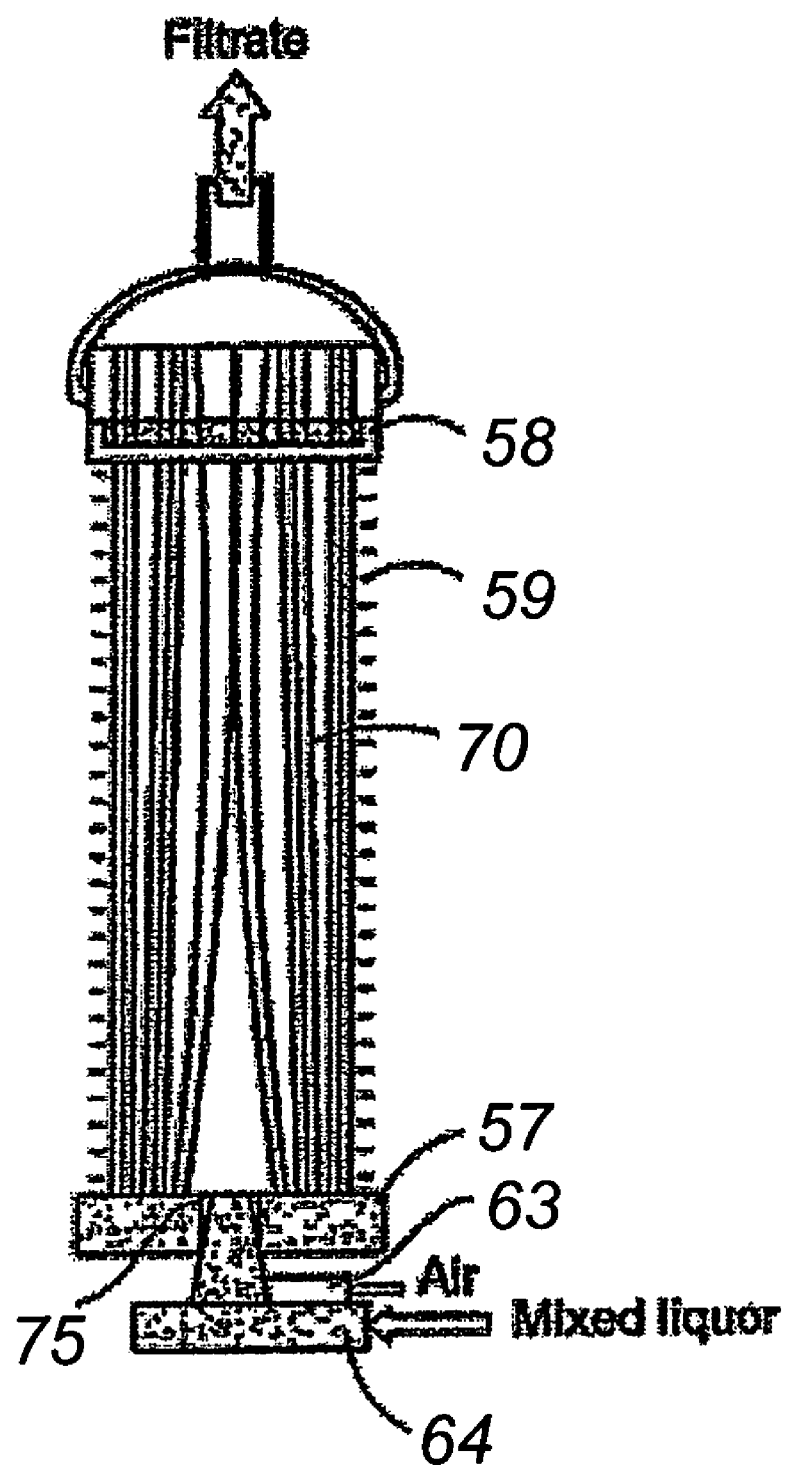
FIG. 12 shows a similar view to FIG. 11 of a membrane module.
Figure 13:
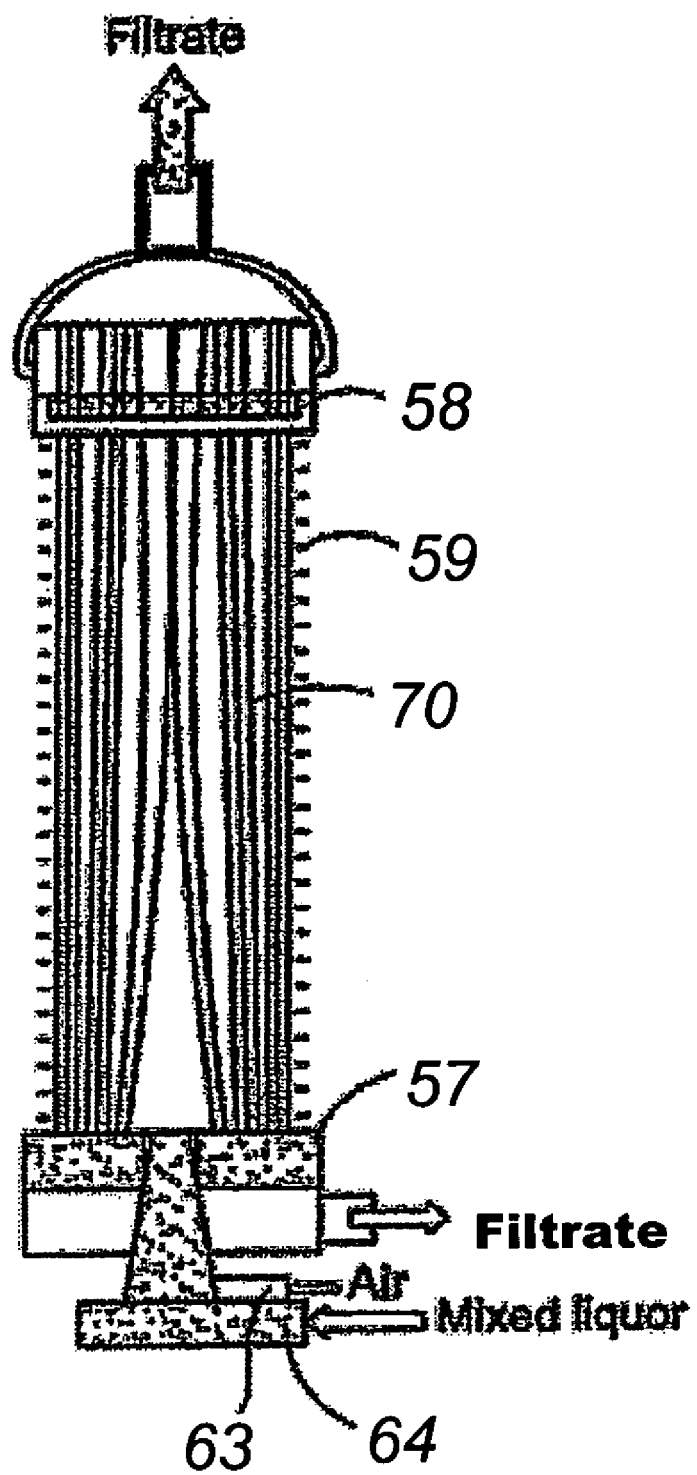
FIG. 13 shows a similar view to FIG. 11 of a membrane module.

FIGS. 12 and 13 show further embodiments of the invention having a similar membrane configuration to that of FIGS. 11a and 11b and jet mixing system similar to that of the embodiment of FIG. 7. The use of a single central hole 75 allows filtrate to be drawn off from the fibers 70 at both ends as shown in FIG. 13.

Figure 14:
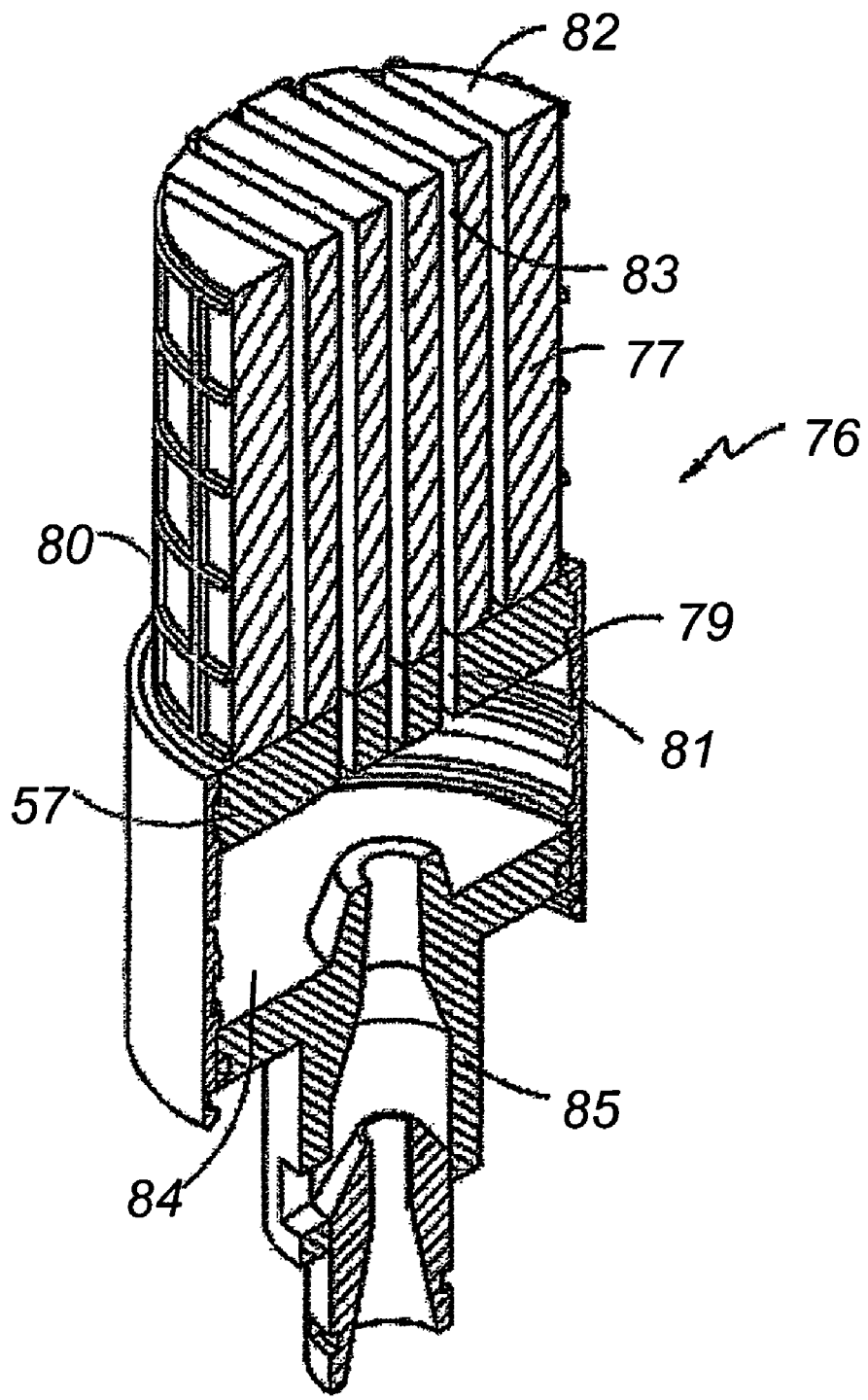
FIG. 14 shows a sectioned perspective pictorial view of the lower end of another preferred embodiment of the membrane module of a membrane bioreactor employed in the filtration apparatus of a preferred embodiment.
Figure 15:
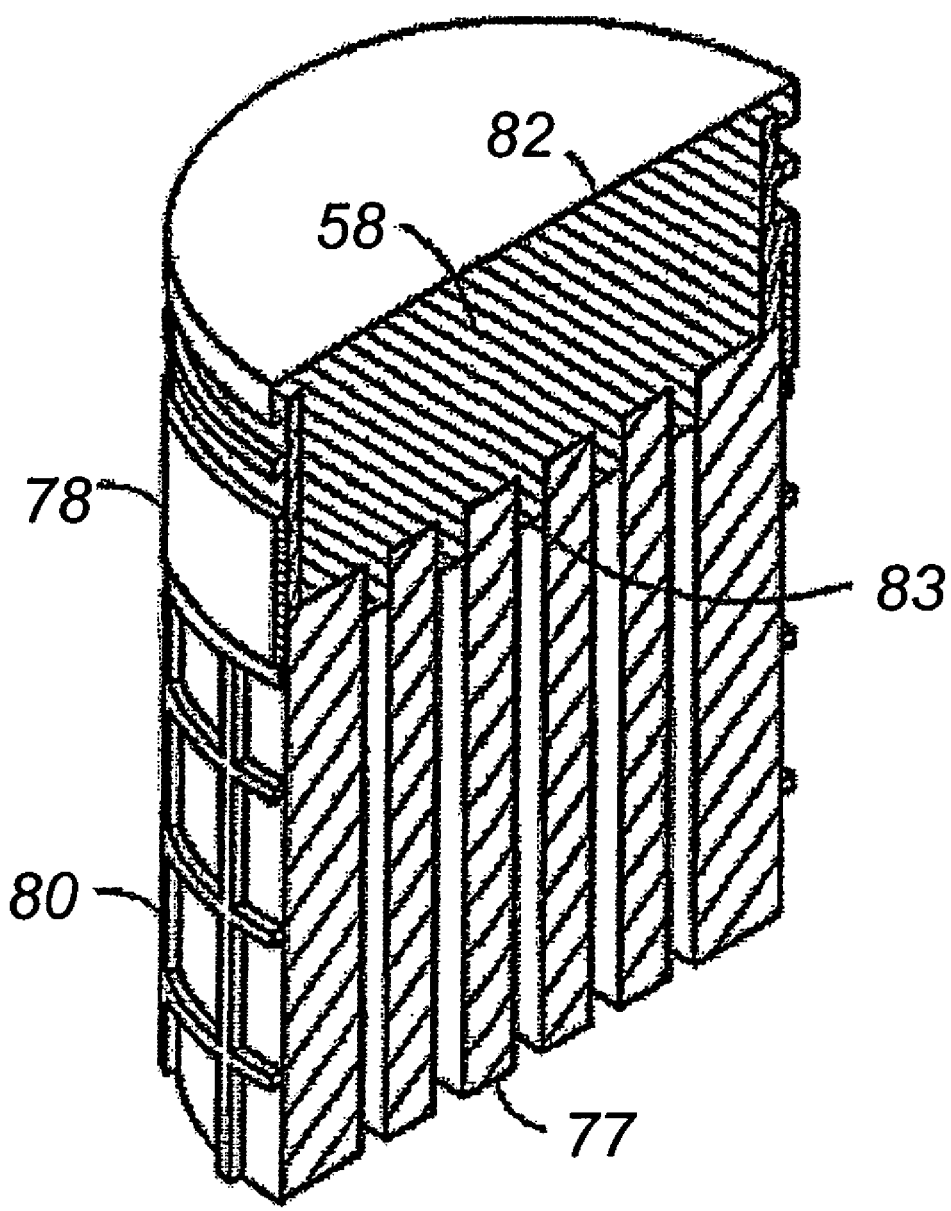
FIG. 15 shows a sectioned perspective pictorial view of the upper end of the membrane module of FIG. 14.

Referring to FIGS. 14 and 15 of the drawings, the module 76 comprises a plurality of hollow fiber membrane bundles 77 mounted in and extending between an upper 58 and lower potting head 57. The potting heads 58 and 57 are mounted in respective potting sleeves 78 and 79 for attachment to appropriate manifolding (not shown). The fiber bundles 77 are surrounded by a screen 80 to prevent excessive movement between the fibers.

As shown in FIG. 14, the lower potting head 57 is provided with a number of parallel arranged slot type aeration holes 81. The fiber membranes 82 are potted in bundles 77 to form a partitioned arrangement having spaces 83 extending transverse of the fiber bundles. The aeration holes 81 are positioned to generally coincide with the partition spaces, though there is generally a number of aeration holes associated with each space.

The lower potting sleeve 79 forms a cavity 84 below the lower pot 57. A gas or a mixture of liquid and gas is injected into this cavity 84, by a jet assembly 85 (described earlier) before passing through the holes 81 into the membrane array.

In use, the use of partitioning enables a high energy flow of scouring gas and liquid mixture, particularly near the pot ends of the fiber bundles, which assist with removal of buildup of accumulated solids around the membrane fibers.

Air is preferably introduced into the module continuously to provide oxygen for microorganism activities and to continuously scour the membranes. Alternatively, in some embodiments, pure oxygen or other gas mixtures can be used instead of air. The clean filtrate is drawn out of the membranes by a suction pump attached to the membrane lumens that pass through the upper pot, or the filtrate can be drawn out of the membranes from the lower pot by gravity or suction pump.

Preferably, the membrane module is operated under low transmembrane pressure (TMP) conditions due to the high concentration of suspended solids (MLSS) present in the reactor. Higher transmembrane pressure can advantageously be employed for reduced concentrations of suspended solids.

The membrane bioreactor is preferably combined with an anaerobic process that assists with further removal of nutrients from the feed sewage. It has been found that the module system of preferred embodiments is more tolerant of high MLSS than many other systems and the efficient air scrub and back wash (when used) assists efficient operation and performance of the bioreactor module.

Figure 16:
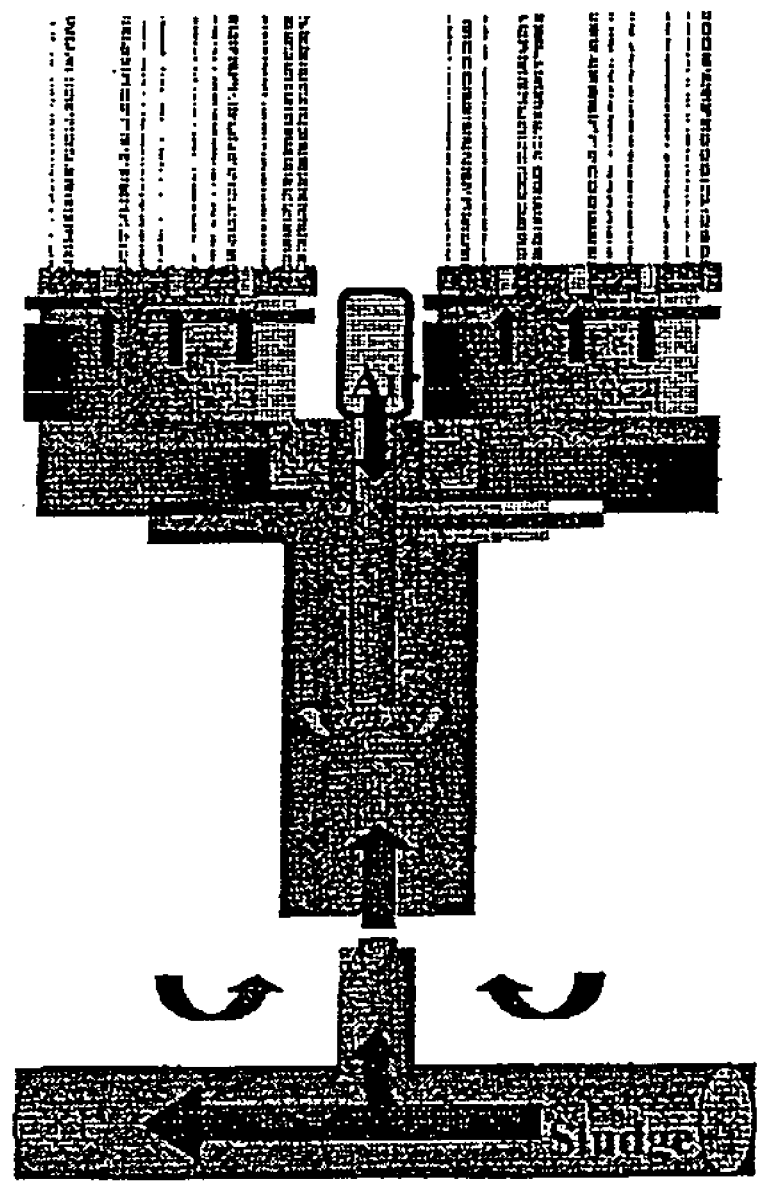
FIG. 16 depicts a hollow fiber membrane module employed in a membrane bioreactor employed in the filtration apparatus of a preferred embodiment.

Any suitable membrane bioreactor can be employed in the water treatment systems of the preferred embodiments. A particularly preferred membrane bioreactor system is designed to draw filtrate from a reservoir of liquid substrate by the use of vertically oriented microporous hollow fibers immersed within the substrate, as illustrated in FIG. 16. FIG. 16 depicts a side view of a so-called "cloverleaf" filtration unit comprising four sub-modules. A plurality of such filtration units in a linear "rack" is immersed in a substrate reservoir.

The illustrated membrane bioreactor filtration unit includes a filtrate sub-manifold (not shown) and an air/liquid substrate sub-manifold, which receive the upper and lower ends, respectively, of the four sub-modules. Each sub-manifold includes four circular fittings or receiving areas, each of which receives an end of one of the sub-modules. Each sub-module is structurally defined by a top cylindrical pot (not shown), a bottom cylindrical pot, and a cage (not shown) connected therebetween to secure the fibers. The pots secure the ends of the hollow fibers and are formed of a resinous or polymeric material. The ends of the cage are fixed to the outer surfaces of the pots. Each pot and associated end of the cage are together received within one of the four circular fittings of each sub-manifold. The sub-manifolds and pots of the sub-modules are coupled together in a fluid-tight relationship with the aid of circular clips and O-ring seals. The cage provides structural connection between the pots of each sub-module.

Each sub-module includes fibers arranged vertically between its top and bottom pot. The fibers have a length somewhat longer than the distance between the pots, such that the fibers can move laterally. The cage closely surrounds the fibers of the sub-module so that, in operation, the outer fibers touch the cage, and lateral movement of the fibers is restricted by the cage. The lumens of the lower ends of the fibers are sealed within the bottom pot, while the upper ends of the fibers are not sealed. In other words, the lumens of the fibers are open to the inside of the filtrate sub-manifold above the upper face of the top pot. The bottom pot includes a plurality of slots extending from its lower face to its upper face, so that the mixture of air bubbles and liquid substrate in the air/liquid substrate sub-manifold can flow upward through the bottom pot to be discharged between the lower ends of the fibers.

The filtrate sub-manifold is connected to a vertically oriented filtrate withdrawal tube that in turn connects to a filtrate manifold (not shown) that receives filtrate from all of the filtration units (such as the illustrated cloverleaf unit) of a rack. The filtrate withdrawal tube is in fluid communication with the upper faces of the top pots of the sub-modules, so that filtrate can be removed through the withdrawal tube. In addition, the system includes an air line that provides air to the air/liquid substrate sub-module skirt, as depicted in FIG. 16.

In operation, the cages of the sub-modules admit the liquid substrate into the region of the hollow fibers, between the top and bottom pots. A pump (not shown) is utilized to apply suction to the filtrate manifold and, thus, the filtrate withdrawal tubes and fiber lumens of the sub-modules. This creates a pressure differential across the walls of the fibers, causing filtrate to pass from the substrate into the lumens of the fibers. The filtrate flows upward through the fiber lumens into the filtrate sub-manifold, through the filtrate withdrawal tube, and upward into the filtrate manifold to be collected outside of the reservoir.

During filtration, particulate matter accumulates on the outer surfaces of the fibers. As increasing amounts of particulate matter stick to the fibers, it is necessary to increase the pressure differential across the fiber walls to generate sufficient filtrate flow. To maintain cleanliness of the outer surfaces of the fibers, air and liquid substrate are mixed in the skirt of the air/liquid substrate sub-module and the mixture is then distributed into the fiber bundles through the slots of the bottom pots and is discharged as a bubble-containing mixture from the upper faces of the bottom pots. Continuous, intermittent, or cyclic aeration can be conducted. It is particularly preferred to conduct cyclic aeration, wherein the air on and air off times are of equal length, and the total cycle time.(time of one air on and one air off period), is from about 1 second or less to about 15 minutes or more, preferably from about 2, 3, 4, 5, 6, 7, 8, 9, 10, 11, 12, 13, or 14 second to about 6, 7, 8, 9, 10, 11, 12, 13, or 14 minutes, and more preferably from about 15, 20, 25, 30, 35, 40, 45, 50, 55, 60, 65, 70, 75, 80, 85, 90, 95, 100, 105, 110, 115, or 120 seconds to about 130, 140, 150, 160, 170, 180, 190, 200, 210, 220, 230, 240, 250, 260, 270, 280, 290, or 300 seconds. The rising bubbles scour (i.e., clean particulate matter from) the fiber surfaces. Aeration wherein the air is provided in uniform bubble sizes can be provided, or a combination of different bubble sizes can be employed, for example, coarse bubbles or fine bubbles, simultaneously or alternately. Regular or irregular cycles (in which the air on and air off times vary) can be employed, as can sinusoidal, triangular, or other types of cycles, wherein the rate of air is not varied in a discontinuous fashion, but rather in a gradual fashion, at a preferred rate or varying rate. Different cycle parameters can be combined and varied, as suitable.

In a particularly preferred embodiment, fine bubbles are continuously provided to the membrane bioreactor for aeration, while coarse bubbles are provided cyclically for scouring. Bubbles are typically from about 0.1 or less to about 50 mm or more in diameter. Bubbles from about 0.1 to about 3.0 mm in diameter, preferably from about 0.2, 0.3, 0.4, 0.5, 0.6, 0.7, 0.9, 0.9, or 1.0 mm to about 1.25, 1.50, 1.75, 2.00, 2.25, 2.50 or 2.75 mm in diameter are particularly effective in providing oxygen to the bioreactor. Bubbles of from about 20 to about 50 mm in diameter, preferably from about 25, 30, or 35 to about 40 or 45 mm in diameter, are particularly effective in scouring the membranes. Bubbles of from about 3 to about 20 mm in diameter, preferably from about 4, 5, 6, 7, 8, 9, or 10 mm to about 11, 12, 13, 14, 15, 16, 17, 18, or 19 mm in diameter, are generally preferred as providing both acceptable oxygenation and scouring.

The cantilever system of preferred embodiments can be applied to a variety of submerged membrane filtration systems and provides a number of advantages over the prior art including a simple one person operation, a compact facility not requiring significant headroom above the tank or costly equipment such as hoists or the like.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A removal system for membranes in a membrane filtration system of the type where the membranes are supported on a membrane support rack in a tank or vessel which, in use, contains liquid to be filtered, the tank comprising:
    a selectively operable opening having an open and a closed position, which in an open position allows the removal of said membranes from the tank, wherein said membrane support rack is movable relative to said tank to move said membranes through said opening, in its open position, to a position outside said tank; and
    an extendable support rack slidable relative to said tank and slidably engaged with the membrane support rack such that said extendable support rack is slidably extended from said tank and said membrane support rack is slid along the extendable support rack to said position outside said tank wherein said extendable support rack is cantilevered from said tank when extended therefrom.

2. A removal system for membranes in a membrane filtration system according to claim 1 wherein said extendable support rack is contained within the bounds of said tank when in a non-extended position.

3. A removal system for membranes in a membrane filtration system according to claim 1 wherein the extendable support rack is slidable along tracks provided on the top of the tank.

* * * * *